No. 877,652. PATENTED JAN. 28, 1908.
F. S. LAFLIN.
ATTACHMENT FOR MOWING MACHINES.
APPLICATION FILED MAR. 26, 1907.
2 SHEETS—SHEET 1.
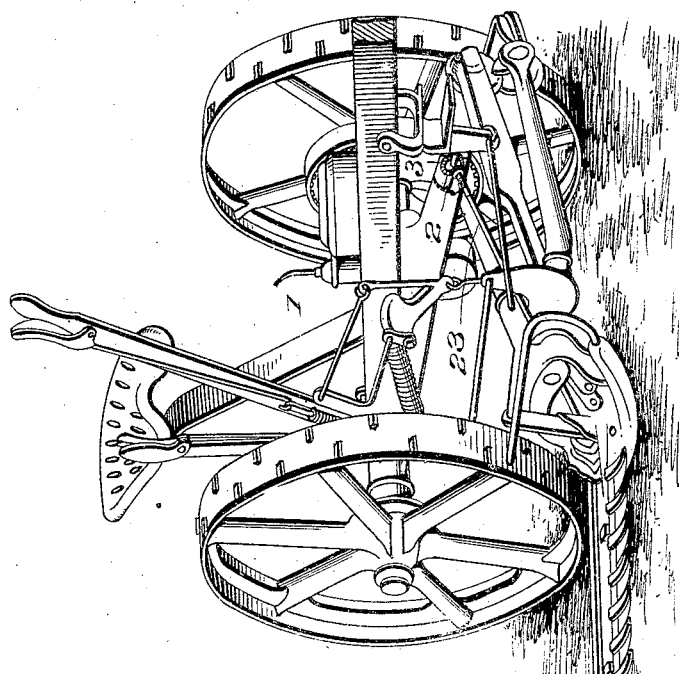
Fig. 1.
Witnesses
Hoyt Cornwall
G. H. Bennett
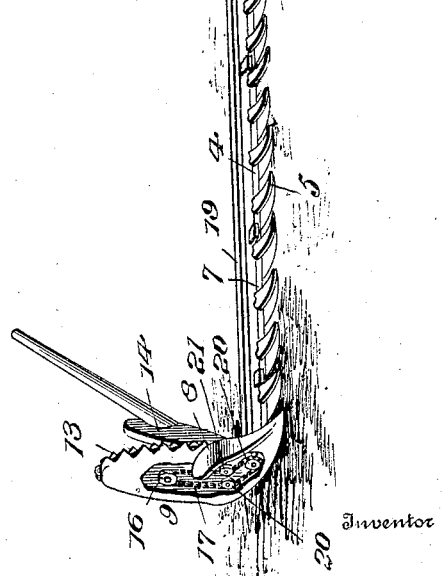
Inventor
F. S. Laflin
By
Attorney No. 877,652. PATENTED JAN. 28, 1908.
F. S. LAFLIN.
ATTACHMENT FOR MOWING MACHINES.
APPLICATION FILED MAR. 26, 1907.
2 SHEETS—SHEET 2.
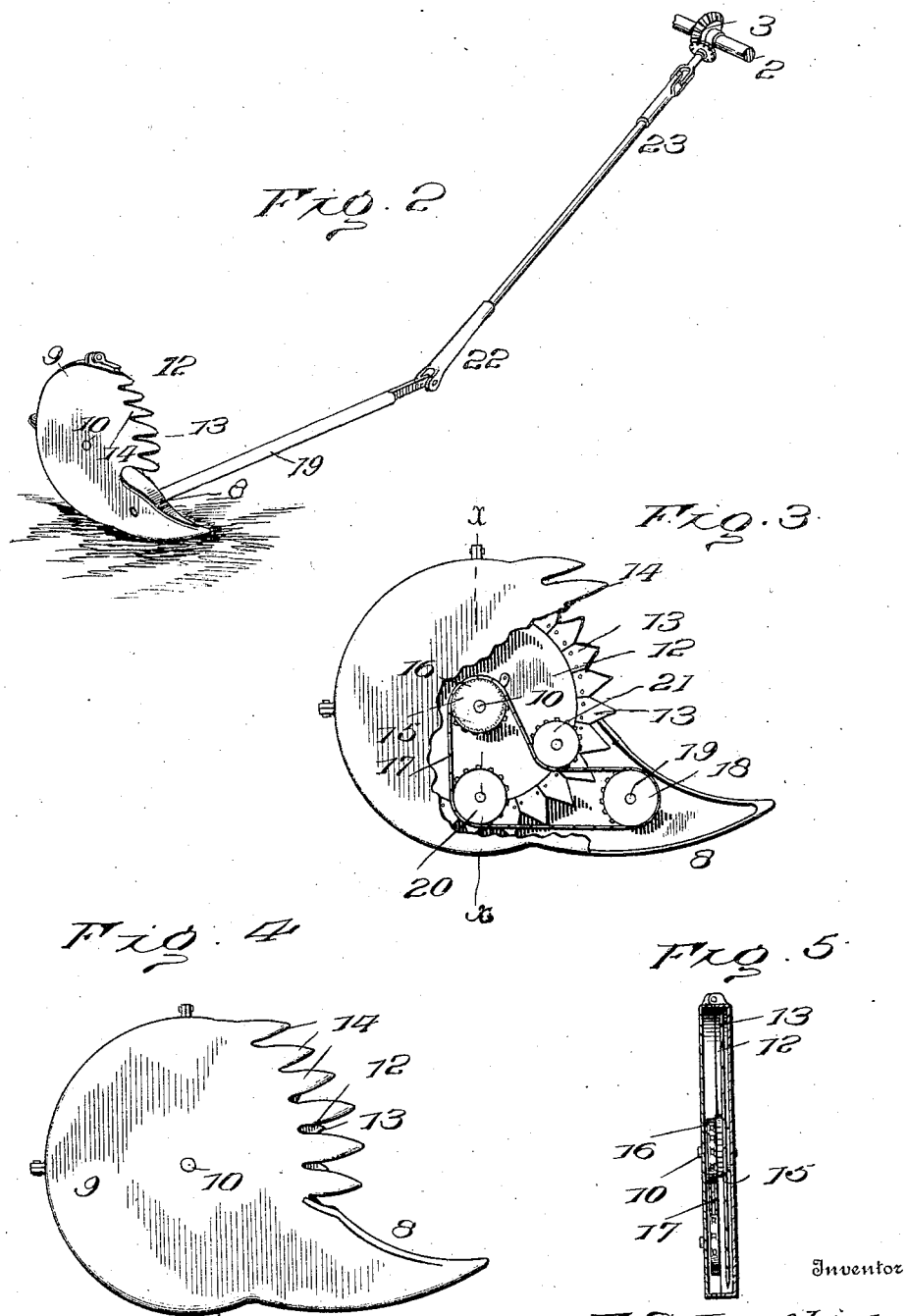
Witnesses
Inventor
F. S. Laflin
By
Attorney

UNITED STATES PATENT OFFICE.

FRANK S. LAFLIN, OF SEARS, ILLINOIS.

ATTACHMENT FOR MOWING-MACHINES.

No. 877,652.   Specification of Letters Patent.   Patented Jan. 28, 1908.

Application filed March 26, 1907. Serial No. 364,710.

*To all whom it may concern:*

Be it known that FRANK S. LAFLIN, citizen of the United States, residing at Sears, in the county of Rock Island and State of Illinois, has invented certain new and useful Improvements in Attachments for Mowing-Machines, of which the following is a specification.

This invention relates to improvements in attachments for hay mowing machines, designed primarily for cutting alfalfa.

With the present mowing machines considerable difficulty is experienced in dividing the cut from the standing alfalfa, resulting in the clogging of the sickle bar and thereby causing delay.

According to my invention I provide a revolving vertically disposed sickle, operating in connection with a series of stationary fingers, to sever the swath from the standing crop, and a horizontally disposed sickle bar to operate in the usual and well known manner.

The invention also relates to the specific details of construction, the arrangement and operation of the same being hereinafter pointed out in the claims.

In the drawings—Figure 1 is a perspective view of my improvement applied to a mowing machine. Fig. 2 is a detached perspective view of the attachment. Fig. 3 is an enlarged elevation of the attachment with parts broken away. Fig. 4 is a detail side elevation. Fig. 5 is a transverse section on the line $x$—$x$, Fig. 3.

The numeral 1, indicates a mowing machine of usual type; 2, a shaft receiving power from the supporting wheels, and 3, a beveled gear mounted on said shaft. A sickle bar 4, is pivotally connected to the mowing machine, comprising the fingers 5, and reciprocating in rear of said fingers is a cutter bar 7. At the outer end of the sickle bar is a dividing board 8, which is formed into a housing 9. Loosely mounted on a shaft 10, in the housing is a revolving sickle 12, provided on its circumference with a series of detachable knives 13, which extend through the open front portion of the housing. The outer edge of the housing above the dividing board is formed into a series of stationary fingers 14, extending outwardly beyond the ends of the blades 13, and coöperating with the latter to form a shear cut. The action of the cutting blades 13, and fingers 14, is similar to the blades and fingers of the sickle bar 4.

The shaft 10, has fixed to it a ratchet wheel 15, which engages a pawl pivoted on the face of the revolving sickle, and on said shaft, adjacent the ratchet wheel is a sprocket wheel 16, around which passes a sprocket chain 17. The sprocket chain passes round a sprocket wheel 18, mounted on a power shaft 19, thence under an idler 20, around the sprocket 16, and under a second idler 21.

The power shaft 19, is mounted in a bearing in the housing, and a bearing on the sickle bar 4, and is provided with a universal joint 22, to connect it with an inclined telescopic shaft 23, having a beveled pinion meshing with the beveled gear 3.

In operation the mower is drawn over the ground, and the sickle bar 12, mows the alfalfa in its path, while the revolving sickle mows the tangled or hanging alfalfa. The blades 13, coöperating with the fingers 14, sever the alfalfa, the latter being directed to the sickle by the dividing board.

What I claim is—

1. The combination with a mower having a reciprocating cutter bar, an upright housing open in front and having a forward extension forming a dividing board, a revolving sickle with blades on its circumference, said blades extending through the open front of the housing, fingers extending from the housing, the said blades coöperating with the fingers and means for revolving the sickle simultaneously with the reciprocation of the cutter bar.

2. In a mowing machine, the combination with a reciprocating cutter bar, an upright housing open in front and having a forward extension forming a dividing board, a revolving sickle with cutting blades on its circumference mounted in the housing, said blades extending through the open front of the housing, stationary fingers extending from the housing with which the revolving sickle blades coöperate, and means for simultaneously reciprocating the cutter bar and revolving the sickle.

3. In a mowing machine, the combination with a reciprocating cutter bar, a housing open in front and having a forward extension forming a dividing board at the outer end of said cutter bar, fingers extending forward of the housing, a revolving sickle having blades mounted within the housing, the blades extending through the open front of the housing and coöperating with the fingers to form a shearing action, and a chain and gear connection within the housing for revolving the sickle.

4. In a mowing machine, the combination with a reciprocating cutter bar, an upright housing open in front and having a forward extension to form a dividing board at the outer end of the cutter bar, a shaft mounted in the housing, a revolving sickle loosely mounted on the shaft and having cutting blades extending through the open end of the housing, a pawl on the sickle, a ratchet wheel and sprocket wheel on the shaft, said ratchet wheel engaging the pawl, a power shaft, a sprocket wheel on the power shaft, and a sprocket chain passing around the sprocket wheels.

In testimony whereof he affixes his signature, in presence of two witnesses.

FRANK S. LAFLIN.

Witnesses:
N. A. LARSON,
FRED PETERSON.